(12) United States Patent
Nyukhtikov et al.

(10) Patent No.: US 12,232,924 B2
(45) Date of Patent: Feb. 25, 2025

(54) BUCCAL CORRIDOR ASSESSMENT AND COMPUTATION

(71) Applicant: Align Technology, Inc., San Jose, CA (US)

(72) Inventors: Mikhail Nyukhtikov, Moscow (RU); Evgeniy Morozov, Ulyanovsk (RU); Valery Prokoshev, Oblast (RU); Olga Likhacheva, Moscow (RU); Anton Lapshin, Nizhniy Novgorod (RU); Rene M. Sterental, Palo Alto, CA (US); Mitra Derakhshan, Herndon, VA (US)

(73) Assignee: Align Technology, Inc., San Jose, CA (US)

( * ) Notice: Subject to any disclaimer, the term of this patent is extended or adjusted under 35 U.S.C. 154(b) by 360 days.

(21) Appl. No.: 17/402,429

(22) Filed: Aug. 13, 2021

(65) Prior Publication Data

US 2021/0369414 A1 Dec. 2, 2021

Related U.S. Application Data

(63) Continuation of application No. 15/998,883, filed on Aug. 15, 2018, now Pat. No. 11,116,605.

(60) Provisional application No. 62/545,899, filed on Aug. 15, 2017.

(51) Int. Cl.
*A61C 7/00* (2006.01)
*A61C 7/08* (2006.01)
*G06T 17/00* (2006.01)

(52) U.S. Cl.
CPC ............. *A61C 7/002* (2013.01); *A61C 7/08* (2013.01); *G06T 17/00* (2013.01); *A61C 2007/004* (2013.01)

(58) Field of Classification Search
CPC ..... A61C 7/002; A61C 7/08; A61C 2007/004; G06T 17/00
See application file for complete search history.

(56) References Cited

U.S. PATENT DOCUMENTS

| | | |
|---|---|---|
| 6,227,851 B1 * | 5/2001 | Chishti .................. A61C 9/002 433/53 |
| 6,299,440 B1 | 10/2001 | Phan et al. |
| 6,318,994 B1 | 11/2001 | Chishti et al. |
| 6,371,761 B1 | 4/2002 | Cheang et al. |
| 6,457,972 B1 | 10/2002 | Chishti et al. |
| 6,488,499 B1 | 12/2002 | Miller |
| 6,554,611 B2 | 4/2003 | Chishti et al. |
| 6,582,229 B1 | 6/2003 | Miller et al. |
| 6,688,886 B2 | 2/2004 | Hughes et al. |
| 6,726,478 B1 | 4/2004 | Isiderio et al. |
| 6,767,208 B2 | 7/2004 | Kaza |
| 6,783,360 B2 | 8/2004 | Chishti |
| 7,063,532 B1 | 6/2006 | Jones et al. |
| 7,074,038 B1 | 7/2006 | Miller |
| 7,108,508 B2 | 9/2006 | Hedge et al. |
| 7,160,107 B2 | 1/2007 | Kopelman et al. |
| 7,293,988 B2 | 11/2007 | Wen |

(Continued)

*Primary Examiner* — Nicholas D Lucchesi
(74) *Attorney, Agent, or Firm* — Shay Glenn LLP

(57) ABSTRACT

Apparatuses and methods for improving a patient's buccal corridor, including developing treatment plans and/or appliances to improve and enhance buccal corridor. Also described herein are methods of treating a patient's teeth to enhance the patient's buccal corridor.

8 Claims, 8 Drawing Sheets

(56) References Cited

U.S. PATENT DOCUMENTS

| | | |
|---|---|---|
| 7,309,230 B2 | 12/2007 | Wen |
| 7,357,634 B2 | 4/2008 | Knopp |
| 7,555,403 B2 | 6/2009 | Kopelman et al. |
| 7,736,147 B2 | 6/2010 | Kaza et al. |
| 7,844,356 B2 | 11/2010 | Matov et al. |
| 7,878,804 B2 | 2/2011 | Korytov et al. |
| 7,942,672 B2 | 5/2011 | Kuo |
| 8,044,954 B2 | 10/2011 | Kitching et al. |
| 8,260,591 B2 | 9/2012 | Kass et al. |
| 8,562,338 B2 | 10/2013 | Kitching et al. |
| 8,591,225 B2 | 11/2013 | Wu et al. |
| 8,706,672 B2 * | 4/2014 | Malfliet .............. G06F 17/00 264/16 |
| 8,788,285 B2 | 7/2014 | Kuo |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,364,296 B2 | 6/2016 | Kuo |
| 10,342,638 B2 | 7/2019 | Kitching et al. |
| 10,463,452 B2 | 11/2019 | Matov et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,151,753 B2 | 10/2021 | Gao et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2005/0182654 A1 | 8/2005 | Abolfathi et al. |
| 2006/0127836 A1 | 6/2006 | Wen |
| 2006/0127852 A1 | 6/2006 | Wen |
| 2006/0127854 A1 | 6/2006 | Wen |
| 2010/0009308 A1 | 1/2010 | Wen et al. |
| 2010/0068672 A1 | 3/2010 | Arjomand et al. |
| 2010/0092907 A1 | 4/2010 | Knopp |
| 2010/0167243 A1 | 7/2010 | Spiridonov et al. |
| 2014/0122027 A1 * | 5/2014 | Andreiko ............. A61B 6/14 703/1 |
| 2016/0242870 A1 | 8/2016 | Matov et al. |
| 2016/0310235 A1 | 10/2016 | Derakhshan et al. |
| 2017/0273760 A1 | 9/2017 | Morton et al. |
| 2018/0280118 A1 | 10/2018 | Cramer |
| 2019/0029784 A1 | 1/2019 | Moalem et al. |
| 2019/0053876 A1 | 2/2019 | Sterental et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |
| 2020/0107915 A1 | 4/2020 | Roschin et al. |
| 2020/0155274 A1 * | 5/2020 | Pimenov ................ G06T 7/60 |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |

* cited by examiner

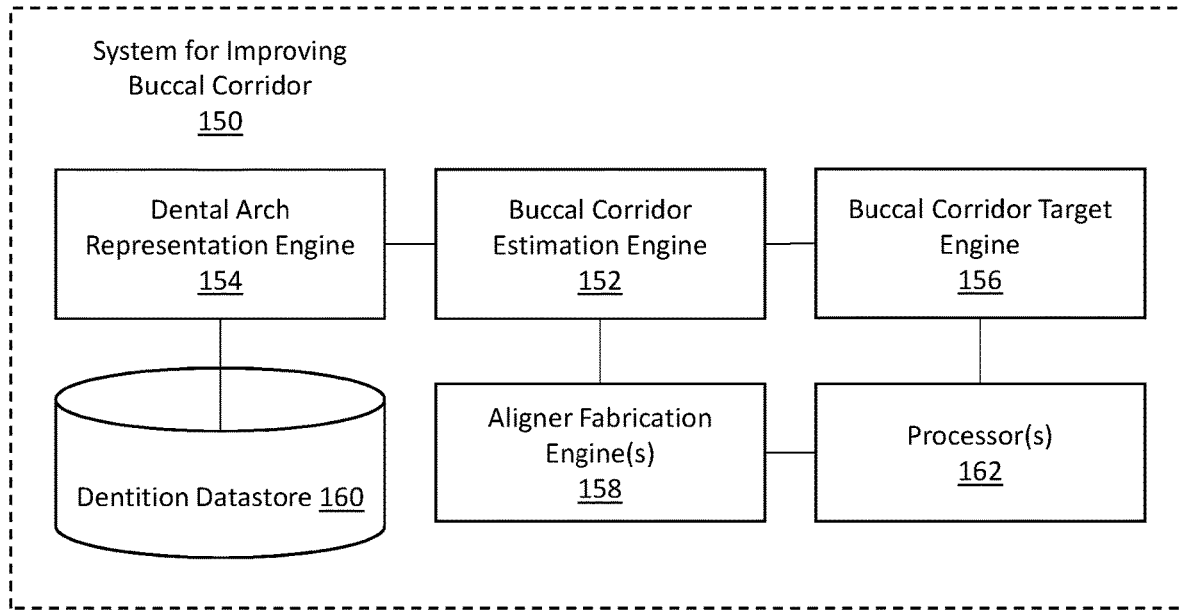
FIG. 1A
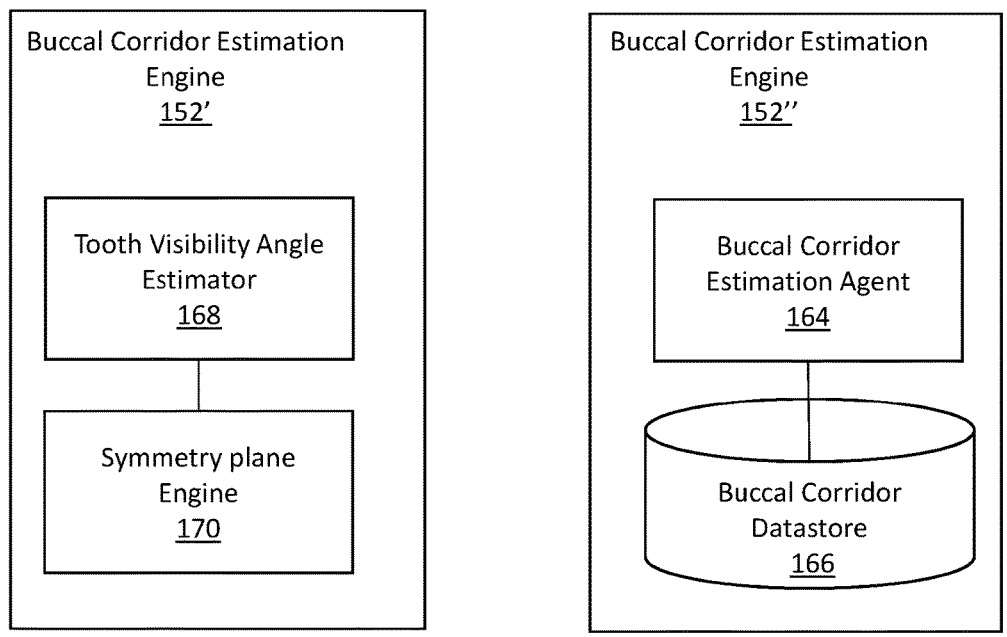
FIG. 1B  FIG. 1C

BUCCAL CORRIDOR ASSESSMENT AND COMPUTATION

CROSS REFERENCE TO RELATED APPLICATIONS

This patent application is a continuation of U.S. patent application Ser. No. 15/998,883, filed Aug. 15, 2018, titled "BUCCAL CORRIDOR ASSESSMENT AND COMPUTATION," now U.S. Patent Application Publication No. 2019/0076214, which claims priority to U.S. Provisional Patent Application No. 62/545,899, filed on Aug. 15, 2017, titled "BUCCAL CORRIDOR ASSESSMENT AND COMPUTATION," which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Orthodontic procedures typically involve repositioning a patient's teeth to a desired arrangement in order to correct malocclusions and/or improve aesthetics. To achieve these objectives, orthodontic appliances such as braces, shell aligners, and the like can be applied to the patient's teeth by an orthodontic practitioner. The appliance can be configured to exert force on one or more teeth in order to effect desired tooth movements according to a treatment plan.

In assessing a final tooth position to be achieved with an orthodontic aligner, doctors may consider many different clinical criteria including bite class, overjet, interproximal reduction, arch form, etc. One criteria that may also be considered is buccal corridor. Buccal corridor is an esthetic criteria that may not impact the patient's health, but impacts the aesthetics of the patient's smile. The buccal corridor may refer to the area of dark space, either or both horizontally and vertically, that is between the outer/lateral margin of the lips and the outside (buccal area) of the posterior dental arches. A good buccal corridor may result in a more aesthetic appearance. Described herein are methods and apparatuses for improving a patient's buccal corridor.

SUMMARY OF THE DISCLOSURE

The present application relates to methods and apparatuses (e.g., devices and systems, including software) for improving a patient's buccal corridor, also including creating treatment plans and/or appliances to improve and enhance buccal corridor. For example, also described herein are methods of treating a patient's teeth including providing a dental practitioner (e.g., doctor, dentist, orthodontist, etc.) with a treatment plan for treating a patient's teeth, and/or adjusting the treatment plan to accommodate modifications made by the dental practitioner.

Thus, described herein are methods for improving a patient's buccal corridor. In general, these methods and apparatuses may adjust the visible tooth angle symmetrically on either side (left side, right side) of the patient's dental arches, particularly the upper dental arch. In some variations the buccal corridor may refer to the visible tooth angle and/or the spacing between the buccal side of the tooth and the patient's cheeks and/or lips (e.g., when smiling).

A measure of a patient's buccal corridor may include the patient's buccal corridor width. Buccal corridor width may be determined (e.g., approximated, measured, or estimated) in a variety of ways. Qualitatively, the buccal corridor width may refer to the negative space that is present between the buccal surface of the posterior teeth and the corner of the lips when the patient smiles. A measure of the patient's buccal corridor may be estimated from the patient's dental arch by measuring the visible tooth angle from a predefined point, which may correlate with the lateral projection of the premolars and molars into the buccal corridor (e.g., the broader this region of the arch form, the greater filling of the buccal corridor). In some variations the buccal corridor width may be determined and/or optimized using just the visible tooth angle. Alternatively or additionally, the buccal corridor width may be estimated using the distance between the buccal surface of one or more of the teeth and the check or lips (e.g., the interior portion of the commissure of the lips). For example, if the cheeks or lips are used as an estimate of the buccal corridor width, it may be measured, for example, from a mesial line angle of the maxillary first premolars to the interior portion of the lips (or cheek). In some variations the buccal corridor width may be represented as a ratio, e.g., the ratio of the intercommisure width divided by the distance from the first premolar to the first premolar. A measure of the patient's buccal corridor may also be a measure of the area between the inner lip region and the lateral most buccal surface of the teeth (e.g., "buccal corridor area"). As used herein, any one or more of these measures of the patient's buccal corridor may be used in the methods described herein. For convenience we described the use of the tooth angle (e.g., measured from the archform), which may be used without requiring the lips or cheek measure, however the general methods and apparatuses described herein may use and refer to any measure of a patient's buccal corridor, including the negative space between the buccal edge of the teeth and the lip/cheek, the buccal corridor area, etc. In some variations, more than one measure of a patient's buccal corridor may be used.

For example, described herein are methods for improving a patient's buccal corridor. A method for treating a patient's teeth to improve the patient's buccal corridor may include: obtaining, in a computing system, a representation of the patient's dentition corresponding to a dental arch (and in some variations, a representation of the patients cheeks and/or lips, e.g., when smiling); determining an initial measure of the patient's buccal corridor (e.g., buccal corridor width based on tooth angle); determining a target measure of the patient's buccal corridor; using the initial measure of the patient's buccal corridor and the target measure of the patient's buccal corridor to determine a treatment plan comprising a series of orthodontic aligner configured to incrementally move the patient's teeth through each stage of the series to improve the patient's buccal corridor to approximate the target measure of the patient's buccal corridor; and outputting the treatment plan. Any of these method may also include determining the treatment plan using additional factors, of which the buccal corridor is one. For example, the determining of the treatment plan may also include correcting or adjusting for malocclusions, preventing collisions, etc.

In some variations an automated agent may be trained (e.g., via machine learning) to propose a target buccal corridor configuration (e.g., a measure of the patient's buccal corridor) based on training against a library of characterized data, such as a library of images showing exposed smiles and/or a library of characterized measures of the patient's buccal corridor.

In any of these methods, the measure of the patient's buccal corridor may be a measure of buccal corridor width which may be determined or estimated by tooth angle from the patient's dental archform. For example, the initial buccal corridor width may be determined, for at least some of the patient's teeth in the dental arch, by an initial tooth angle between a symmetry plane through a midline of the dental arch and a line tangent to each tooth that intersects an assessment point on the symmetry plane at a pre-determined distance anterior to the dental arch. A measure of the patient's buccal corridor may be based on the set of tooth angles, and in particular, by determining how well these tooth angles fit with a set of rules for optimal buccal corridor, as described in greater detail below; this fit may provide one or more values (e.g., an index) that may be used to achieve the targeted buccal corridor configuration.

For example, determining the target measure of the patient's buccal corridor for the dental arch may comprise determining, for at least some of the patient's teeth in the dental arch, an optimized tooth angle between a symmetry plane through a midline of the dental arch and a line from an assessment point on the symmetry plane at a pre-determined distance anterior to the dental arch, to a new position of the patient's tooth such that, for a given tooth: a visibility width of any tooth posterior to the given tooth is less than a visibility width of the given tooth; and the visibility widths of the patient's teeth from anterior to posterior decrease.

Thus, using the initial buccal corridor width and the target buccal corridor width to determine a treatment plan may comprise estimating a target dental arch model based on the optimized tooth angles.

In some variations, determining the initial and target measures of the patient's buccal corridor may include determining the initial and a target buccal corridor width by measuring the spacing between the lateral buccal region of the teeth and the lip or cheeks. In some variations the initial measure of the patient's buccal corridor may include determining the buccal corridor area (e.g., the area of the region between the lateral buccal side of the teeth and the lip margin or cheek margin.

In any of the variations described herein, the method may include using an actual or virtual (e.g., simulated) image of the patient's smile, e.g., from a frontal view of the patient's face. For example, in some variations a two-dimensional image of the patient's teeth and/or smile (including lips/cheek) may be generated from a three-dimensional model of the patient's dentition and one or more images of the patient's face. Thus, the final measure of the patient's buccal corridor may include a measure taken from a simulation of the patient's smile in which the patient's teeth have been moved. For example, in some variations, determining the initial buccal corridor width for the dental arch may comprise estimating a distance between the patient's cheeks/lips and the buccal side of the patient's teeth; in some variations, this distance between the cheeks/lips and the buccal side of the patient's teeth may be measured from a two-dimensional image of the patient's smile. For example, determining the target buccal corridor width for the dental arch may comprise estimating a target distance between the patient's lips/cheeks and the buccal side of the patient's teeth, e.g., using a 2D image (including a simulated image) of the patient's smile Any of these methods may include generating one or a series of orthodontic devices from the target dental arch model. For example, a series of orthodontic aligners may be generated from the treatment plan.

In some variations, the measure of the patient's buccal corridor may include a measure of the tooth angle of the patient's teeth, when measured from a predetermined point in front of the patient, and these angles may be used determine an improved buccal corridor, e.g., by identifying a target measure of the patient's buccal corridor, including a target set of tooth angles for all or some of the patient's teeth. For example, described herein are methods for treating a patient's teeth to improve the patient's buccal corridor that may include: obtaining, in a computing system, a representation of the patient's teeth corresponding to a dental arch; identifying a symmetry plane through a midline of the dental arch; specifying an assessment point on the symmetry plane at a pre-determined distance anterior to the dental arch; determining, for at least some of the patient's teeth in the dental arch, an initial tooth angle between the symmetry plane and a line tangent to each tooth that intersects the assessment point; determining, for at least some of the patient's teeth in the dental arch, an optimized tooth angle between the symmetry plane and a line from the assessment point to a new position of the patient's tooth such that, for a given tooth: a visibility width of any tooth posterior to the given tooth is less than a visibility width of the given tooth; and the visibility widths of the patient's teeth from anterior to posterior decrease; and outputting a target dental arch model incorporating a buccal corridor recommendation based on the optimized tooth angles.

In particular, any of these methods and apparatuses may adjust the visible tooth angle so that the teeth between the patient's canines and molars on both sides of the patient's dental arch(es) decreases with some regular progression (e.g., a geometric progression) by the end of the treatment, in order to improve the patient's buccal corridor. This may mean moving one or more teeth buccally and/or lingually. As will be described in greater detail herein, the visible tooth angle may be an approximation of the amount of the tooth that is visible when viewed some distance (e.g., between 0.1 meters and 2 or more meters in front of the patient).

Any of the methods for improving the patient's buccal corridor described herein may be included or incorporated with other methods for aligning or adjusting a patient's teeth, or they may be performed on their own. Thus, a series of dental aligners may be formed using the methods described herein in which the patient's teeth are moved to adjust the buccal corridor as well as other alignment criterion, including adjusting gaps between teeth, tooth alignment, adjusting bite, etc.

For example, described herein are methods of adjusting a patient's buccal corridor that include receiving (e.g., digitally, in a computing system) a model, e.g., a dataset, of the patient's teeth, identifying a symmetry plane through a midline of the patient's dental arch (and/or jaw), specifying an assessment point on the symmetry plane at a pre-determined distance from a buccal surface of the patient's teeth, determining, for each of the patient's teeth between the patient's canines and molars (e.g., inclusive), an initial tooth angle between the symmetry plane and a line tangent to each tooth that intersects the assessment point, determining, using the initial tooth angle, an optimized tooth angle between the symmetry plane and a line from the assessment point to a new position of the patient's tooth for each of the patient's teeth such that, for a given tooth: a visibility width of any tooth posterior to the given tooth is less than a visibility width of the given tooth; and the visibility widths of the patient's teeth from anterior to posterior decrease. The method may include outputting a target dental arch model incorporating a buccal corridor recommendation based on the optimized tooth angles, e.g., including forming one or a series of aligners to move the patient's teeth to the target. Thus, outputting may be communicating the target dental arch model to fabricate the one or more dental aligners.

Alternatively or additionally, the method may optimize the visible tooth angels (which may be calculated from the tooth angles). This process may be iterative.

Any of these methods may further comprise generating an orthodontic device (or more likely a series of orthodontic devices, e.g., aligners) from the buccal corridor recommendation(s).

In general, the assessment point is positioned anterior to the dental arch, and may be positioned, e.g., between about 0.1 meter (e.g., 0.05 m, 0.75 m, 0.1 m, 0.2 m, 0.3 m, 0.4 m, 0.5 m, etc.) and 2 or more meters (e.g., 2 m, 3 m, 4 m, 5 m, 6 m, 7 m, etc.). For example, the assessment point may be approximately 0.5 m from the patient's teeth.

The given tooth may be an upper left canine and the tooth posterior to the given tooth may be the upper left first bicuspid.

The optimized tooth angle may be limited so that it does not result in a final buccal corridor recommendation that moves any tooth more than a pre-determined maximum distance.

The method may further comprise evaluating at least one of the following factors during the determining an optimized tooth angle step: 1) minimizing a difference between the initial tooth angle and the optimized tooth angle; 2) maintaining the tooth movement within a maximum allowed amount of tooth movement; 3) maintaining a symmetry between teeth on a left side of the dental arch and teeth on a right side of the dental arch within a pre-determined symmetry tolerance value; and/or 4) maintaining a gap distance between adjacent teeth within a predetermined range.

In any of the variations described herein, the factors may be assigned a priority value. Any of these methods may be constrained so that fulfilling a factor with a low priority value does not result in not fulfilling a factor with a high priority value (e.g., higher priority values are fulfilled ahead of lower priority values, and lower priority value factors may not be fulfilled at all if it prevents applying, e.g., fulfilling, the higher priority value factors).

In general, additional tooth movement criterion or properties may be applied in addition (or in conjunction with) the buccal corridor considerations described herein. For example, determining an optimized tooth angle may takes into account a patient's arch form. Alternatively or additionally, determining an optimized tooth angle step further takes into account a patient's bite relationship.

In any of the methods described herein, e.g., a method for treating a patient's teeth to improve the patient's buccal corridor, the method may alternatively or additionally include: receiving, in a computing system, a digital model of the patient's teeth corresponding to a dental arch; determining, for at least some of the patient's teeth in the dental arch, an initial tooth angle between a symmetry plane through a midline of a dental arch and a line tangent to each tooth that intersects an assessment point at a pre-determined distance anterior to the dental arch; determining, for at least some of the patient's teeth in the dental arch, an optimized tooth angle between the symmetry plane and a line from the assessment point to a new position of the patient's tooth such that, for a given tooth: a visibility width of a tooth adjacent and posterior to the given tooth is q times a visibility width of the given tooth, where q is between 0.5 and 1; and the visibility widths of the patient's teeth on a left side of the symmetry plane are approximately symmetric with the visibility widths of the patient's teeth on a right side of the symmetry plane; and outputting a target dental arch model incorporating a buccal corridor recommendation based on the optimized tooth angles.

Also described herein are dental appliances, e.g., aligners, including a sequence of aligners that are configured to be worn sequentially to adjust a patient's buccal corridor as described herein. For example, described herein are series of dental appliances configured to optimize a buccal corridor of a patient's teeth, comprising: a plurality of dental appliances arranged in a sequence of aligners that are configured to be worn sequentially over time by a patient, wherein each dental appliance in the sequence comprises a shell having a plurality of tooth spaces therein configured to receive the patient's canines, bicuspids and molars; wherein for each aligner in the sequence, there is a right side ordered series of visible angles for each adjacent tooth space extending from the canines to the molars on a right side of a plane of symmetry through the aligner, and a left side ordered series of visible angles for each adjacent tooth space extending from the canines to the molars on a left side of the plane of symmetry through the aligner; further, wherein for each aligner in the sequence, when compared to an aligner configured to be worn earlier in the sequence, the right side ordered series of visible angles for each aligner more closely approximates a decreasing progression of visible angles for each adjacent tooth space extending from the canines to the molars, and this decreasing progression is more symmetric with the left ordered series of visible angles; and wherein the visible angles are measured from an assessment point that is positioned between about 0.1 meters and 2.5 meters from the patient's teeth.

For example, a series of dental appliances configured to optimize a buccal corridor of a patient's teeth, may include: a plurality of dental appliances arranged in a sequence of aligners that are configured to be worn sequentially over time by a patient, wherein each dental appliance in the sequence comprises a shell having a plurality of tooth spaces therein configured to receive the patient's canines, bicuspids and molars; wherein for each aligner in the sequence, there is a right side ordered series of visible angles for each adjacent tooth space extending from the canines to the molars on a right side of a plane of symmetry through the aligner, and a left side ordered series of visible angles for each adjacent tooth space extending from the canines to the molars on a left side of the plane of symmetry through the aligner, wherein the visible angles are measured from an assessment point that is positioned between proximal to the aligner on the plane of symmetry; further, wherein for each aligner in the sequence, when compared to an aligner configured to be worn earlier in the sequence, the right side ordered series of visible angles for each aligner more closely approximates a decreasing geometric progression of visible angles for each adjacent tooth space extending from the canines to the molars, and the right side ordered series of visible angles is as symmetrical, or more symmetrical, to the left side ordered series of visible angles about the plane of symmetry.

Also described herein are dental appliance configured to optimize a buccal corridor of a patient's teeth is also provided, comprising an appliance designed to implement at least a portion of a treatment plan, comprising a shell having a plurality of cavities therein designed to receive the patient's teeth, wherein at least one of a size, shape, location, and orientation of at least one of the cavities is designed based upon a mathematical evaluation of the patient's teeth that calculates an optimized tooth angle for each of the patient's teeth between a symmetry plane of the patient's teeth and a tangent to each tooth that extends through an assessment point on the symmetry plane, wherein the optimized tooth angle for a given tooth provides that a visibility width of a tooth posterior to the given tooth is less than a visibility width of the given tooth, and that the visibility widths of the patient's teeth from anterior to posterior decrease in an angular progression. As mentioned, the assessment point may be positioned, e.g., approximately 0.5 m from the patient's teeth.

The given tooth may be an upper left canine and the tooth posterior to the given tooth is the upper left first bicuspid.

The optimized tooth angle may be limited such that it cannot result in a final buccal corridor recommendation that moves any tooth more than a pre-determined maximum distance.

The mathematical evaluation may comprise evaluating at least one of the following factors: 1) a difference between the initial tooth angle and the optimized tooth angle; 2) a maximum allowed amount of tooth movement; 3) a symmetry between teeth on a left side of the patient's jaw and teeth on a right side of the patient's jaw; 4) a pre-determined system tolerance value; 5) a gap distance between adjacent teeth.

The factors may be assigned a priority value. The apparatus or method of making the apparatus may be limited such that fulfilling a factor with a low priority value cannot result in not fulfilling a factor with a high priority value.

The mathematical evaluation may further take into account a patient's arch form. Alternatively or additionally, the mathematical evaluation may take into account a patient's bite relationship.

Also described herein are non-transitory computing device readable medium having instructions stored thereon that are executable by a processor to cause a computing device to receive in the computing device a model (e.g., a dataset) of the patient's teeth, identify a symmetry plane through a midline of the patient's jaw, specify an assessment point on the symmetry plane at a pre-determined distance from a buccal surface of the patient's teeth, determine, for each of the patient's teeth, an initial tooth angle between the symmetry plane and a line tangent to each tooth that intersects the assessment point, determine an optimized tooth angle for each of the patient's teeth such that, for a given tooth a visibility width of a tooth posterior to the given tooth is less than a visibility width of the given tooth, and the visibility widths of the patient's teeth from anterior to posterior decrease, and output a final buccal corridor recommendation with the optimized tooth angles.

For example, a non-transitory computing device readable medium may have instructions stored thereon that are executable by a processor to cause a computing device to: receive, in the computing device, a digital model of the patient's teeth corresponding to a dental arch; determine, for at least some of the patient's teeth in the dental arch, an initial tooth angle between a symmetry plane through a midline of a dental arch and a line tangent to each tooth that intersects an assessment point at a pre-determined distance anterior to the dental arch; determine, for at least some of the patient's teeth in the dental arch, an optimized tooth angle between the symmetry plane and a line from the assessment point to a new position of the patient's tooth such that, for a given tooth: a visibility width of a tooth adjacent and posterior to the given tooth is q times a visibility width of the given tooth, where q is between 0.5 and 1 (e.g., 0.6 and 1, 0.7 and, 0.6 and 0.9, etc.); and the visibility widths of the patient's teeth on a left side of the symmetry plane are approximately symmetric with the visibility widths of the patient's teeth on a right side of the symmetry plane; and output a target dental arch model incorporating a buccal corridor recommendation based on the optimized tooth angles.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A is a diagram showing an example of a system for improving a patient's buccal corridor.

FIG. 1B is a diagram showing an example of a buccal corridor estimation engine.

FIG. 1C is a diagram showing an example of a buccal corridor estimation engine, including an automated buccal corridor estimation agent.

DETAILED DESCRIPTION

Figure 1D:
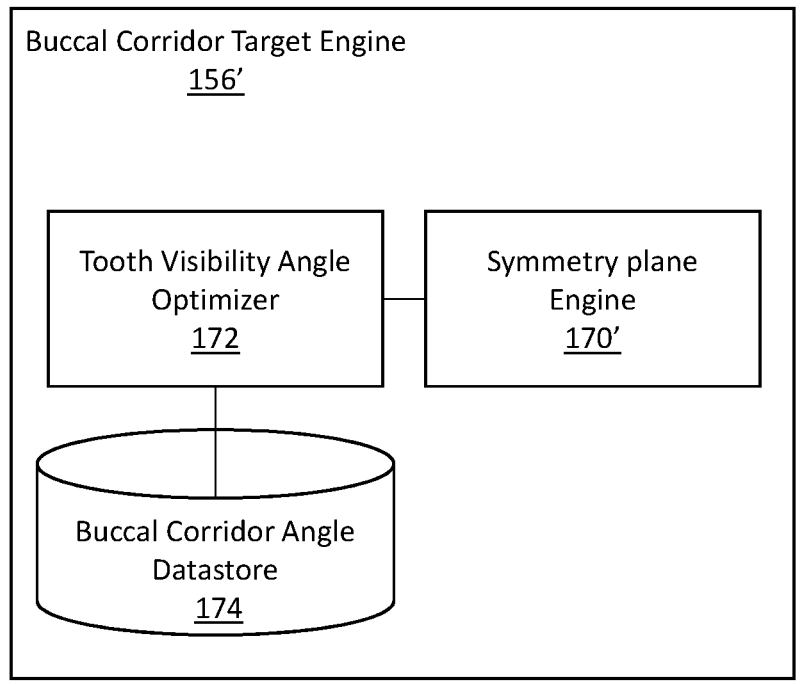
FIG. 1D is a diagram showing an example of a buccal corridor target engine.

The present disclosure is related to apparatuses (e.g., systems and devices, including software, firmware and/or hardware, e.g., computing device readable media) and methods, for adjusting, improving or correcting a patient's buccal corridor. These methods and apparatuses may therefore use the patient's buccal corridor as a criterion for final tooth alignment. Generally, the patient's buccal corridor may be estimated as described herein, based on the sequence of visible tooth angles on either side of the patient's dental arch(es).

In particular, this disclosure provides methods of buccal corridor assessment, including processes for measuring (e.g., quantifying) or modeling a patient's buccal corridor. The present disclosure further provides techniques for automatically computing teeth positions which correct the buccal corridor based on a buccal corridor assessment.

Throughout the body of this disclosure, the use of the terms "orthodontic aligner", "aligner", or "dental aligner"

may be used synonymously with the terms "appliance" and "dental appliance" in reference to dental applications.

FIG. 1A is a diagram showing an example of a system for improving a patient's buccal corridor 150. The modules of the system for improving buccal corridor may include one or more engines and one or more datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The system for improving a patient's buccal corridor 150 may include a computer-readable medium, a dental arch representation engine 154, a dentition datastore 160, a buccal corridor estimation engine 152 (which may determine an estimation of the patient's current or initial buccal corridor), a buccal corridor target engine 156 (which may determine one or more target buccal corridor configurations), and optionally an aligner fabrication engine 158. One or more processors 162 may be included as part of any of these systems. One or more of the modules of the system 150 may be coupled to one another (e.g., through the example couplings shown in FIG. 1A) or to modules not explicitly shown in FIG. 1A. The computer-readable medium may include any computer-readable medium, including without limitation a bus, a wired network, a wireless network, or some combination thereof.

FIGS. 1B and 1C illustrate alternative examples of buccal corridor estimation engine(s) 152', 152". FIG. 1C illustrate an example of a buccal corridor estimation engine 152" that may implement one or more automated agents configured to learn a patient's buccal corridor, e.g., using machine learning, from a library or datastore of characterized buccal corridors 166. The dental arch representation may include, for example, a digital model of the patient's dental arch, including a "3D virtual representation," of the dental arch. A 3D virtual representation may refer to a 3D rendering of a tooth. Examples of 3D virtual representations include animated 3D renderings, composite 3D renderings assembled from 2D images, etc. A 3D virtual representation may have one or more "virtual surface contours," or contours that define surfaces of the tooth in a virtual 3D space.

FIG. 1B illustrates a first buccal corridor estimation engine 152' that may describe (e.g., quantitatively and/or qualitatively describe) the patient's initial buccal corridor. The buccal corridor estimation engine may include a tooth visibility angle estimator 168 that may provide a quantified estimate of the visible surface of some or all of the patient's teeth (and particularly lateral teeth, e.g., canines, premolars, molars) from an estimated position in front of the patient. A standard position for determining the tooth angle (e.g., visible tooth angle) may be determined by the symmetric plane engine 170, which may determine, from the representation of the dental arch, a standard plane of symmetry containing a line through the dental arch from which an angle may be measured relative to the edges of each tooth in a plane perpendicular to the symmetry plane. The tooth visibility angel may be used to provide an estimate of the buccal corridor, as will be described in greater detail below.

Figure 1E:
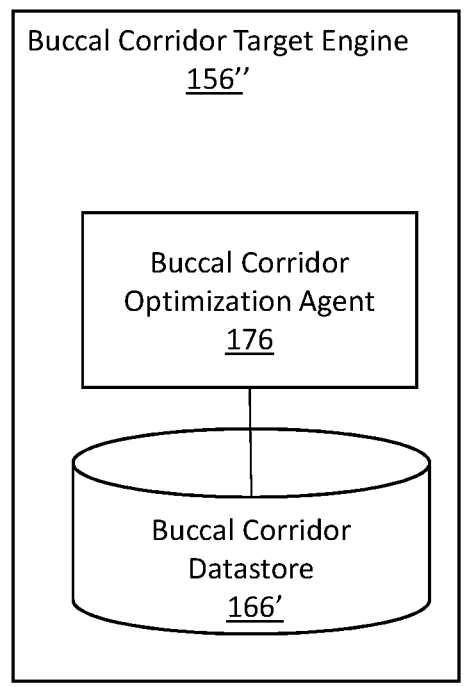
FIG. 1E is a diagram showing an example of a buccal corridor target engine including an automatic buccal corridor optimization agent.

FIGS. 1D and 1E show alternative buccal corridor target engines 156', 156". Any of the engines described herein, such as the buccal corridor estimation engine 152 and the buccal corridor target engine 156 may share and/or duplicate components between these or other engines, such as the Buccal corridor datastore 166, 166' which may include a database of dentition examples having characterized buccal corridors; the database may include the dentition and in some cases the adjacent teeth regions. In FIG. 1D, the buccal corridor target engine 156 is configured to determine a target, e.g., an optimized, buccal corridor for the patient's dentition, and may include a tooth visibility angle optimizer 172 that works with a symmetry plane engine 170' (which may be the same symmetry plane engine 170 of the buccal corridor estimation engine 152) and may also use the buccal corridor angle datastore 174. FIG. 1E illustrates an example of a buccal corridor target engine 156" that may include a buccal corridor optimization agent 176 and a buccal corridor datastore 156'; the buccal corridor optimization agent may automatically determine an optimal buccal corridor after being trained (e.g., using the buccal corridor datastore 166').

Any of the systems described herein, including the systems for improving buccal corridor 150 described above, may include an aligner fabrication engine 158 for designing a treatment plan and/or fabricating a series of aligners corresponding to the treatment plan. The aligner fabrication engine(s) 158 may implement one or more automated agents configured to fabricate an aligner. Examples of an aligner are described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System. Throughout the description herein, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances." The aligner fabrication engine(s) 158 may be part of 3D printing systems, thermoforming systems, or some combination thereof.

The dentition datastore 160 may be configured to store 3D virtual representations of different dentitions (e.g., upper and/or lower arch) and may also include other regions of the oral cavity, including the cheeks. As will be noted herein, the 3D virtual representations may comprise 3D models from a variety of subjects. Examples of such subjects include past orthodontic patients, models, cadavers, etc.

Figure 1F:
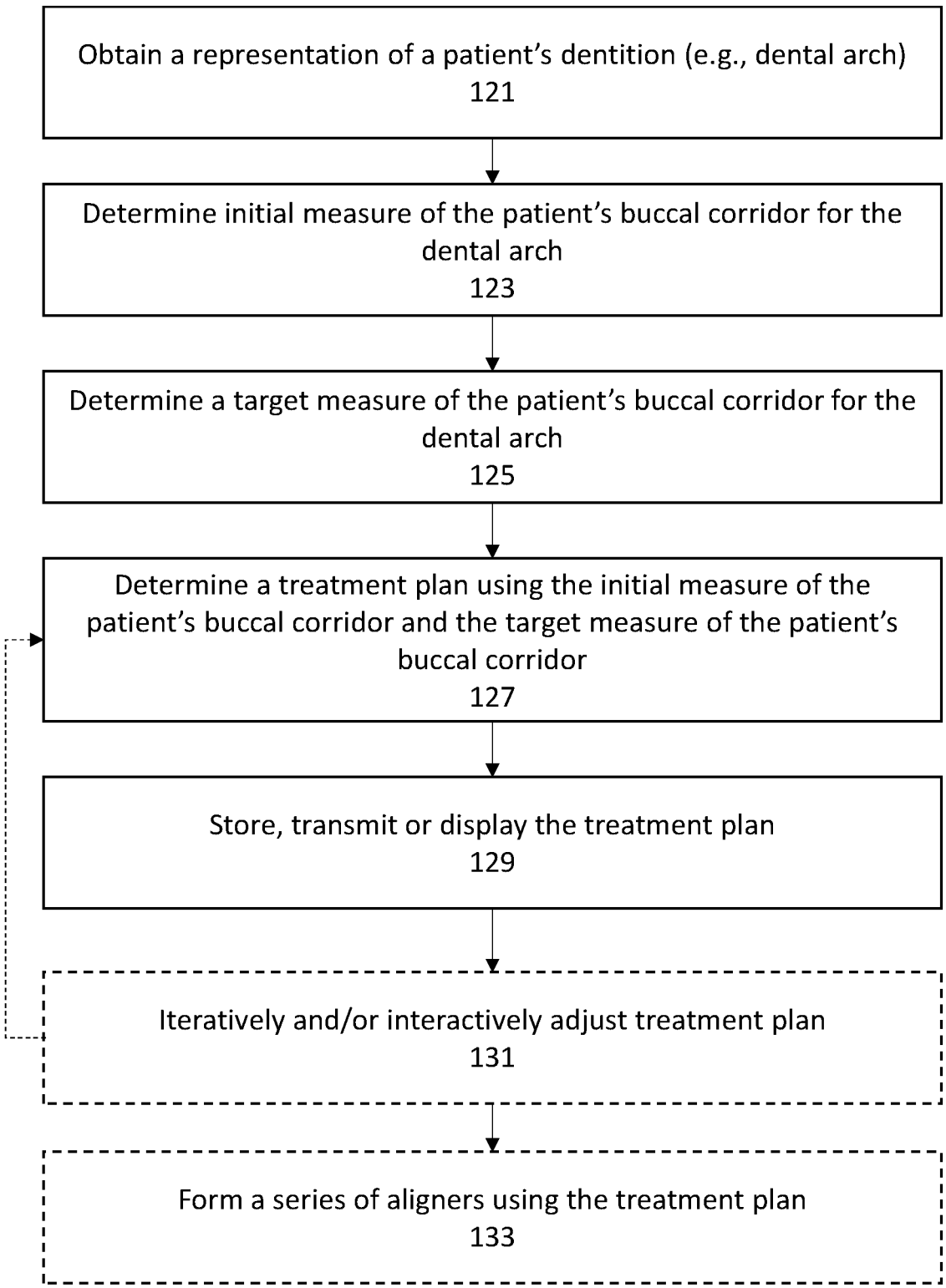
FIG. 1F is a flowchart of an example of a method of treating a patient's teeth to improve the patient's buccal corridor.

FIG. 1F illustrates a method for improving a patient's buccal corridor. The method may include obtaining a representation of the patient's dentition (e.g., dental arch) 121; in some variations this may include the patient's cheeks, etc. In some variations it does not include the soft tissue, but only the patient's teeth. Based on the patient's dentition, the method may then include determining, using a processor, the initial measure of the patient's buccal corridor for the dental arch 123. As will be described in greater detail below, there are numerous ways in which the method may determine the measure of the patient's buccal corridor, such as by measuring the tooth angle (the visible width of the tooth from a fixed and predetermined position anterior to the patient's mouth), determining the spacing between the lateral (e.g., the buccal) side of the teeth and the lip/cheek(s), and/or by using a trained system (e.g., via machine learning) to estimate the measure of the patient's buccal corridor (e.g., the actual buccal corridor width, buccal corridor area, or a qualitative indicator).

A target buccal corridor and/or measure of the patient's buccal corridor may then be determined 125. For example, the target measure of the patient's buccal corridor may be an optimized measure of the patient's buccal corridor (e.g., buccal corridor width) based on a predetermined range or ranges. In some variations, the optimized measure of the patient's buccal corridor is selected from a database of predetermined optimized measures of the patient's buccal corridor.

Optionally, the methods and/or apparatuses described herein may determine a treatment plan using the initial measure of the patient's buccal corridor at the target measure of the patient's buccal corridor 127. The treatment plan may include one or more stages for moving teeth in order to approximate the target measure of the patient's buccal corridor following the staged treatment steps. An aligner may be used to achieve each treatment step of the treatment plan and the design (e.g., configuration) of each aligner in the treatment plan may be determined. The treatment plan may be adjusted, e.g., by a patient, technician, dental professional (e.g., orthodontist, doctor, etc.) and the either or both the target buccal corridor and/or the treatment plan (e.g., the stages/steps of the treatment plan) recalculated to accommodate the adjustments. In any of these variations, other considerations for tooth position, including target final tooth positions, may be included in the determination of the treatment plan. For example, correction of malocclusions, prevention of collisions, etc.

The treatment plan may be stored, displayed and/or transmitted 129, and the corresponding series of aligners may be fabricated as described herein 133.

Figure 1G:
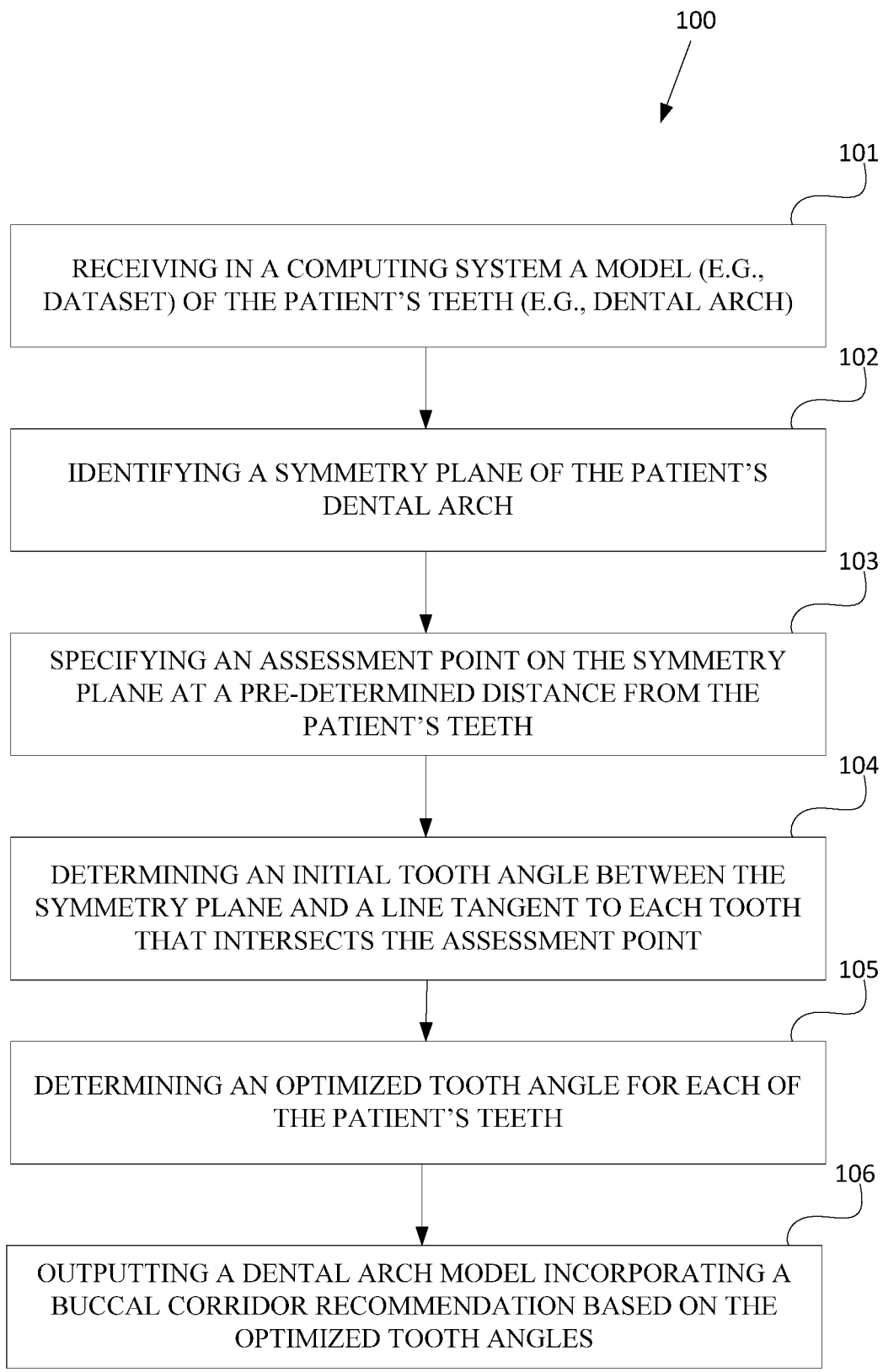
FIG. 1G is a flowchart illustrating an example of a method of providing a buccal corridor recommendation to a doctor for a patient's teeth.

FIG. 1G is a flowchart schematically illustrating a method of improving a patient's buccal corridor, for generating an aligner or series of aligners, and/or for providing a buccal corridor recommendation to a doctor for a patient's teeth. At step 101 of FIG. 1G, the method 100 may optionally initially include receiving, in a computing system, a digital model comprising a dataset of the patient's teeth (e.g., the upper arch, lower arch, or both). In some embodiments, the dataset can be generated by scanning the patient's teeth with a 3D scanner or obtaining dental impressions of the patient's teeth. The dataset can include information regarding the shape, size, and orientation for each of the patient's teeth in the Universal Numbering System.

Figure 2:
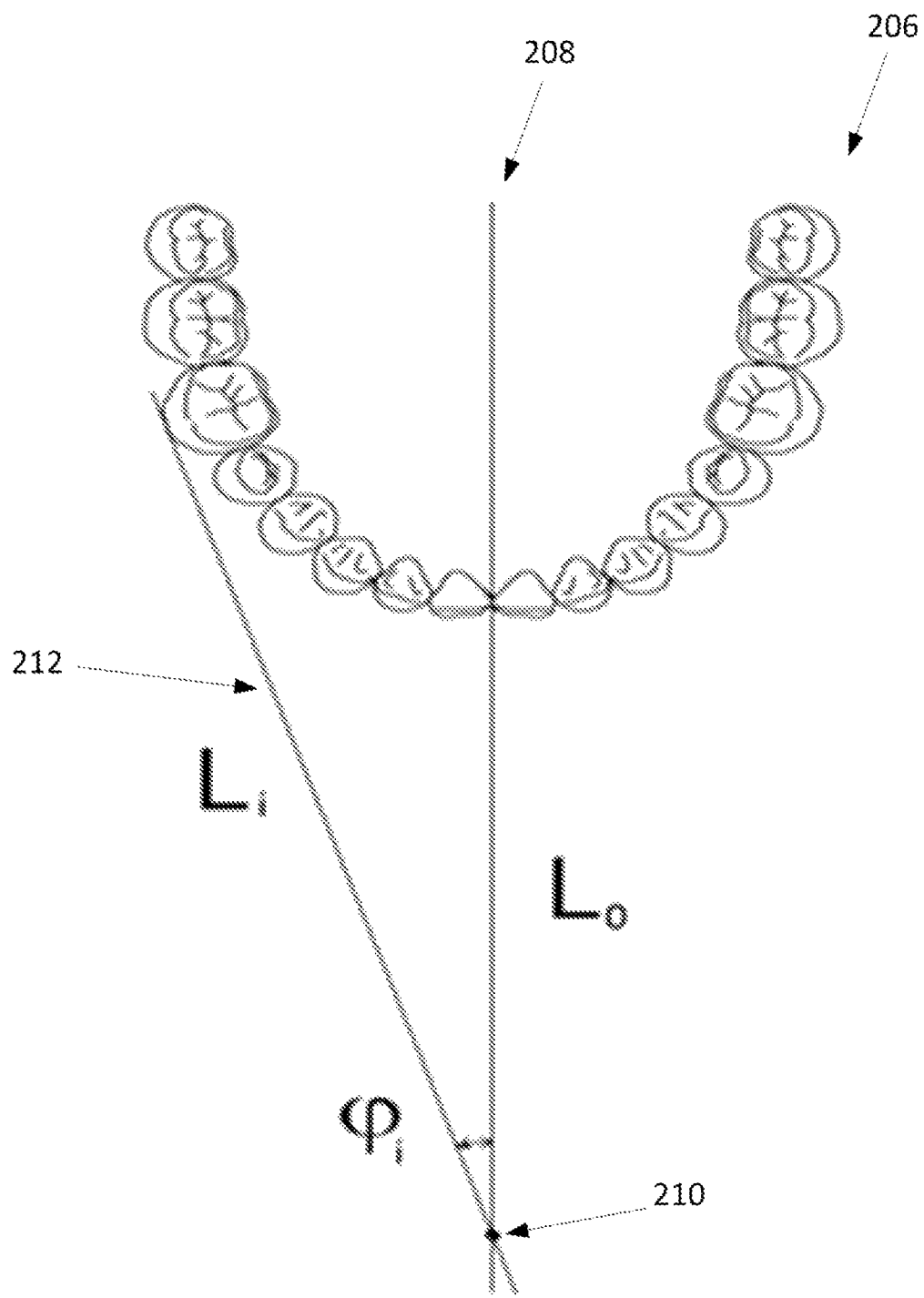
FIG. 2 shows a patient's upper teeth including a symmetry plane and tangent line used to determine optimal buccal corridor.

At step 102 of flowchart 100 in FIG. 1G, the method can further include identifying a symmetry plane through a midline of the patient's jaw from the dataset. FIG. 2 illustrates an example of the upper teeth 206 of a patient. A symmetry plane 208 of the patient's teeth is shown in FIG. 2, which bisects the patient's dental arch (e.g., jaw) between the two central incisors. The symmetry plane 208 divides the patient's dental arch into a left jaw portion and a right jaw portion.

At step 103 of flowchart 100 in FIG. 1G, the method may further include specifying an assessment point on the symmetry plane at a pre-determined distance from a buccal surface of the patient's teeth. Referring to FIG. 2, assessment point 210 can be located along the symmetry plane 208 at a pre-determined distance $L_o$ anterior to the patient's teeth. The assessment point may be located anterior to the teeth, e.g., greater than 0.05 meter (e.g., 0.1 m, 0.2 m, 0.3 m, 0.4 m, 0.5 m, 0.6 m, 0.7 m, etc.). In some examples, the assessment point can be located approximately 0.5 m anterior to the central incisors.

At step 104 of flowchart 100 in FIG. 1G, the method may further include determining, for each tooth of the patient, an initial tooth angle between the symmetry plane and a line tangent to each tooth that intersects the assessment point. Referring again to FIG. 2, a tangent line 212 is shown that intersects the symmetry plane 208 at the assessment point 210 and contacts an outer edge of the first molar of the patient's tooth. For a given tooth i, the intersection of the tangent line 212 and the symmetry plane 208 at assessment point 210 defines an angle $\varphi_i$ and a distance $L_i$ from the assessment point 208 to the tooth i. The initial tooth angle can be determined for each of the patient's teeth.

An angle visibility (e.g., a visible tooth angle) for each tooth can be defined as the difference between the tooth's initial tooth angle and previous tooth's initial tooth angle. For example, the angle visibility of a second bicuspid will be the initial tooth angle of the second bicuspid minus the initial tooth angle of the first bicuspid.

At step 105 of flowchart 100 in FIG. 1G, any of these methods can further include determining an optimized tooth angle for each of the patient's teeth. The optimized tooth angle for each of the patient's teeth can be approximated by identifying new tooth positions (particularly for the teeth between the incisors and the molars, inclusive) fulfilling the following conditions:

$$\varphi_i \leq \varphi_{i+1} \quad (1)$$

$$\varphi_{i+1} - \varphi_i \leq \varphi_i - \varphi_{i-1} \quad (2)$$

$$q \cdot (\varphi_i - \varphi_{i-1}) \leq \varphi_{i+1} - \varphi_i \quad (3)$$

$$-\varepsilon \leq (\varphi_{i+1,left} - \varphi_{i,left}) - (\varphi_{i+1,right} - \varphi_{i,right}) \leq \varepsilon \quad (4)$$

where q is a parameter of the technique, e.g., a number (or function) having a value between 0 and 1 (e.g., between 0.5 and 1, between 0.6 and 1, between 0.7 and 1, etc.). Condition (1) defines that tooth number i is seen when viewed from the assessment point, and condition (2) defines that the visibility width of tooth i+1 as less than the visibility width of tooth i. Condition (3) defines that visibility width decreases from anterior to posterior. Condition (4) defines that a visible width of the teeth should be symmetric for the left and right parts of each jaw.

The conditions below can be used to solve the more optimal positions (compared to current or earlier tooth positions) of the teeth in a dental arch, accounting for the maximal allowed amount of tooth movement, by further applying conditions, constraints or factors, such as:

$$\begin{cases} -\text{Lim}_i \leq \Delta_i \leq \text{Lim}_i \{7\} \\ -(\varphi_{i+1} - \varphi_i) \leq \Delta_{i+1} - \Delta_i \leq FLTmax \{6\} \\ -FLTmax \leq \Delta_{i+1} - 2 \cdot \Delta_i + \Delta_{i-1} \leq (\varphi_{i+1} - 2 \cdot \varphi_i + \varphi_{i-1}) \{5\} \\ (\varphi_{i+1} - (1+q) \cdot \varphi_i + q \cdot \varphi_{i-1}) \leq \Delta_{i+1} - (1+q) \cdot \Delta_i + q \cdot \Delta_{i-1} \leq FLTmax \{4\} \\ -((\varphi_{i+1,left} - \varphi_{i,left}) - (\varphi_{i+1,right} - \varphi_{i,right})) - \varepsilon \leq \\ (\Delta_{i+1,left} - \Delta_{i,left}) - (\Delta_{i+1,right} - \Delta_{i,right}) \leq -(\varphi_{i+1,left} - \varphi_{i,left}) - (\varphi_{i+1,right} - \varphi_{i,right})) + \varepsilon\{3\} \\ \Delta_{molar} = 0\{2\} \\ \Delta_i = 0|_{i \neq molars}\{1\} \\ \text{we omit an index}_{ini} \text{ for } \varphi \text{ to reduce a formula size} \end{cases}$$

Many factors can be evaluated to determine the final positions. Here $\Delta_i$ is difference between the initial angle for tooth i and its optimal angle. $\text{Lim}_i$ is the maximal allowed amount of tooth movement (e.g., between 0.5 mm and 2.5 mm, between 0.5 mm and 2 mm, between 1 mm and 1.75 mm, between 1.25 mm and 1.75 mm, between 1 mm and 1.5 mm, etc.), $\varphi_{i,left}$ is tooth i of the left jaw segment angle and $\varphi_{i,right}$ is tooth i of the right jaw segment angle. $\varepsilon$ is symmetry tolerance (some predefined small number, e.g., less than 0.05 degrees, less than 0.04 degrees, less than 0.03 degrees, less than 0.02 degrees, less than 0.01 degrees, etc.), $FLT_{max}$ is computational analog of infinity (some maximal number). Numbers {1}, ..., {7} may set out priorities of the inequalities. The lower the number (i.e., closer to 1), the higher the priority of the inequality. Fulfilling inequalities of lower priorities must not lead to violating inequalities of higher priorities.

As used herein an optimal buccal corridor may refer to a target buccal corridor. The target or optimal buccal corridor may be determined by modifying the position of the teeth as little as possible from a starting position (e.g., the patient's initial tooth position) to achieve a new set of tooth positions in which the conditions described above (e.g., the relative size of each tooth angle for the teeth extending from the canines to the molars decreases in a geometric progression, from the anterior to the posterior portion of the arch, there is a high degree of symmetry of the teeth on either side of the plane of symmetry through the midline of the arch, etc.

Thus, for example, based on the priorities above, the methods and apparatuses for enhancing buccal corridor may determine a tooth position by applying a least-squares technique to determine tooth position under the specified constraints. Note that additional constraints may be based on other tooth positioning demands, which may be given a higher priority (e.g., overall arch form of the dental arch, the bite relationship, etc.).

The priority system of inequalities can be solved, e.g., using software that computes new (e.g., final and/or intermediate) tooth positions. The gain is minimizing mean squared error for inequalities. In some embodiments, the criteria defined above may be assessed for each tooth of the patient's jaw from the canine to the last molar. Fulfilling these conditions may result in an optimized tooth angle for each of the patient's teeth to produce a corrected, improved, or optimal buccal corridor for the patient, which may be used to treat the patient. For example, by forming one or a series of sequentially-worn aligners.

At step 106 of flowchart 100 in FIG. 1G, a final buccal corridor recommendation is outputted as part of a dental arch model that is based on the optimized tooth angles for each of the patient's teeth. The output can be, for example, a buccal corridor recommendation dataset that includes the positions and orientations of the patient's teeth that result in proper buccal corridor. The output of the system can also include the angle $\varphi_{i,left}$ and $\varphi_{i,right}$ for both jaws.

Figure 3B:
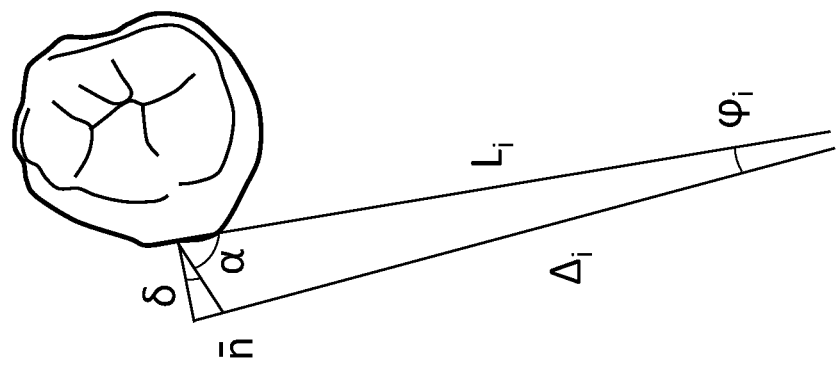
FIGS. 3A and 3B illustrate the process of moving a patient's teeth from the initial position to the optimal buccal corridor position.
Figure 3A:
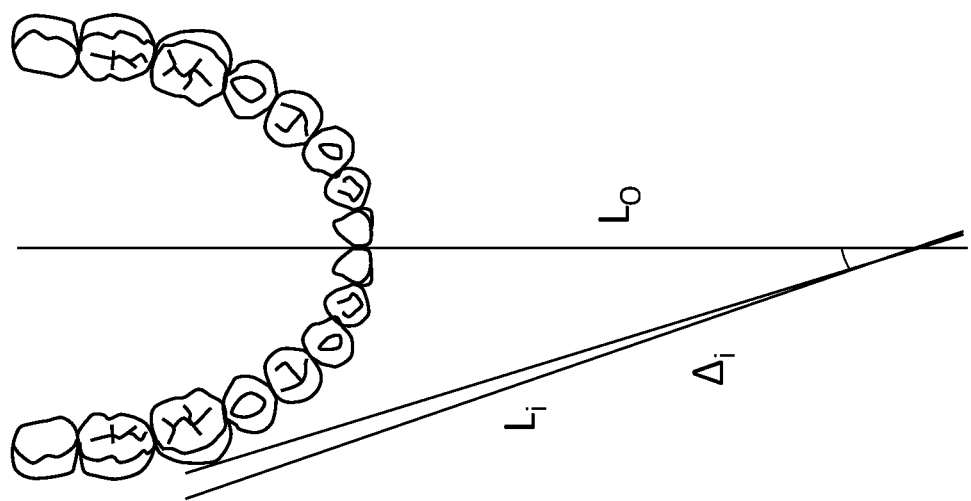

FIGS. 3A and 3B illustrate how to shift the patient's teeth, e.g., with an orthodontic device according to the angles described above. FIG. 3A shows the initial tooth angles as described above in FIGS. 1 and 2. FIG. 3B shows the amount of shift needed to move each tooth to the optimal tooth angle. In FIG. 3B, n—is a normal to arch at center of tooth projection, α—is an angle between arch normal and ray $L_i$. Angle δ is defined as:

$$\delta = 90 - \frac{\Delta_i}{2} - \alpha$$

The base of the triangle can be approximated:

$$2 \cdot L_i \cdot \tan\frac{\delta}{2} \approx L_i \cdot \delta$$

The tooth shift in the normal direction is approximately equal to:

$$n \approx L_i \cdot \Delta_i \cdot \sin\left(90 - \frac{\Delta_i}{2} - \alpha\right) \approx L_i \cdot \Delta_i \cdot \sin(\alpha)$$

And the amounts of movement for each of the teeth may be computed. This technique can further be applied iteratively with other final position techniques like IPR/spacing distribution, collisions resolving, optimal bite class setting and so on.

Figure 4:
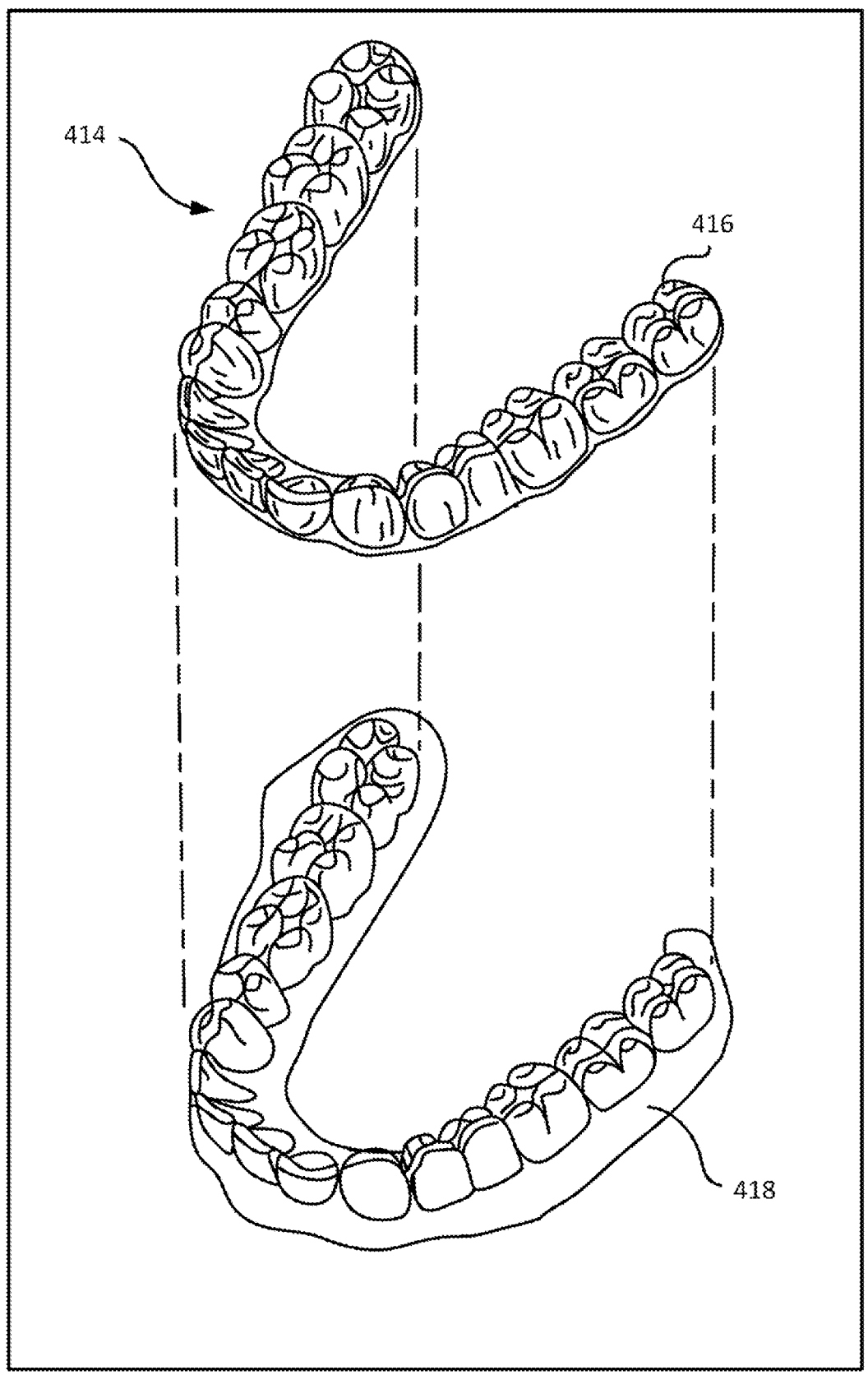
FIG. 4 is one example of a dental aligner.

In some embodiments, the method can further comprise generating an orthodontic device from the final buccal corridor recommendation. FIG. 4 shows one embodiment of an orthodontic device 414 that includes a number of tooth shaped cavities 416 configured to be placed around the teeth and jaw 418 of a patient. The orthodontic device can be configured to move the patient's teeth from an initial tooth position to a final or optimized tooth position that incorporates the final buccal corridor recommendation described above. The orthodontic device can be designed to move the patient's teeth as close to the optimal tooth angles as possible. However, as also described above, the orthodontic device may be designed so as to not move any given tooth more than a maximum distance from the initial tooth position.

Figure 5:
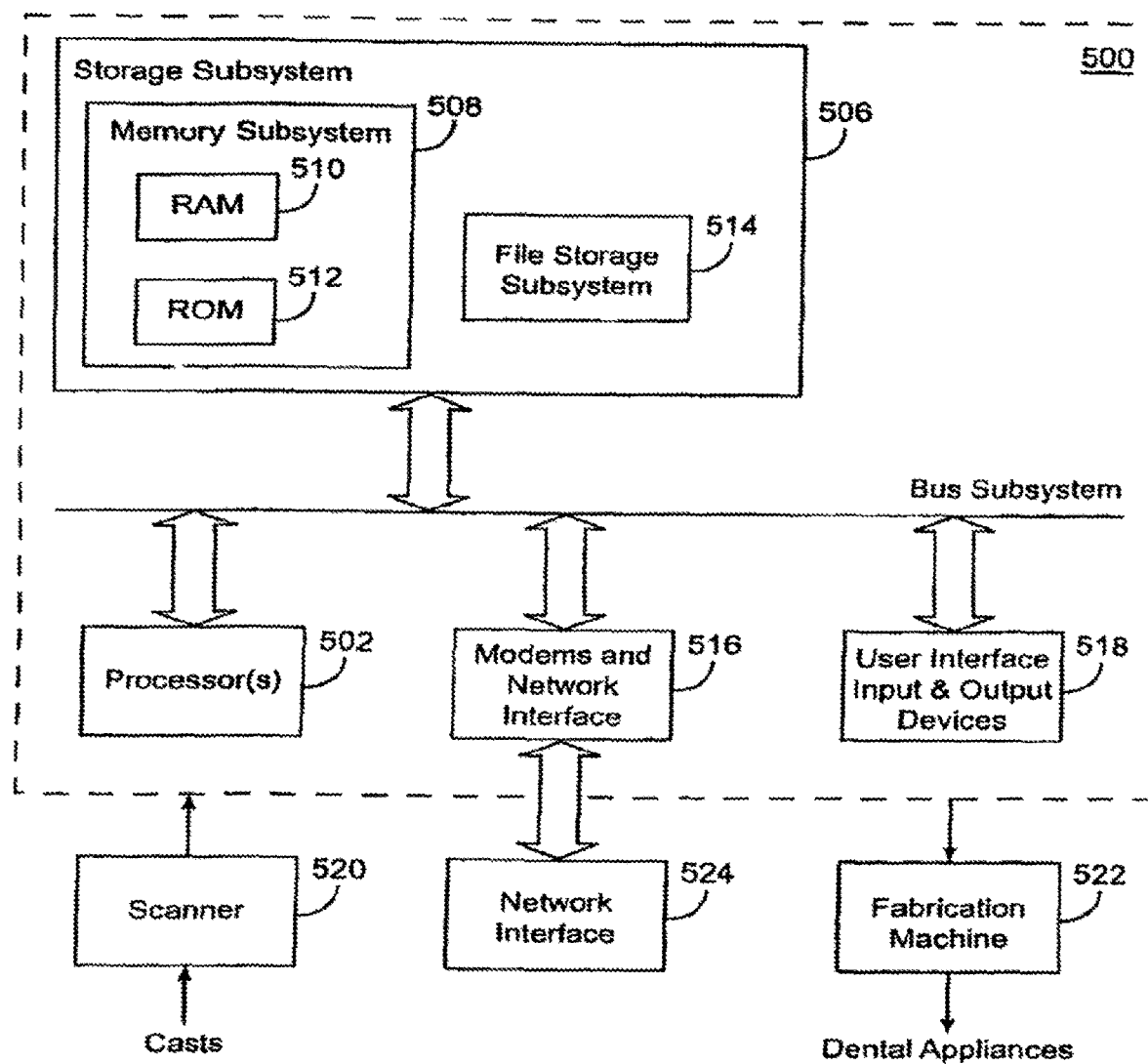
FIG. 5 is a simplified block diagram of a data processing system which can be used to perform the methods and techniques described herein.

The methods described herein may be performed by an apparatus, such as a data processing system, which may include hardware, software, and/or firmware for performing many of these steps described above. For example, FIG. 5 is a simplified block diagram of a data processing system 500. Data processing system 500 typically includes at least one processor 502 which communicates with a number of peripheral devices over bus subsystem 504. These peripheral devices typically include a storage subsystem 506 (memory subsystem 508 and file storage subsystem 514), a set of user interface input and output devices 518, and an interface to outside networks 516, including the public switched telephone network. This interface is shown schematically as "Modems and Network Interface" block 516, and is coupled to corresponding interface devices in other data processing systems over communication network interface 524. Data processing system 500 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 506 maintains the basic programming and data constructs that provide the functionality of the present invention. The software modules discussed above are typically stored in storage subsystem 506. Storage subsystem 506 typically comprises memory subsystem 508 and file storage subsystem 514.

Memory subsystem 508 typically includes a number of memories including a main random access memory (RAM) 510 for storage of instructions and data during program execution and a read only memory (ROM) 512 in which fixed instructions are stored. In the case of Macintosh-compatible personal computers the ROM would include portions of the operating system; in the case of IBM-compatible personal computers, this would include the BIOS (basic input/output system). File storage subsystem 514 provides persistent (nonvolatile) storage for program and data files, and may include, for example, a flash memory storage, a hard disk drive, etc., (including any associated removable media). There may also be other devices such as a CD-ROM drive and optical drives (all with their associated removable media). The system may include drives of the type with removable media cartridges. One or more of the drives may be located at a remote location, such as in a server on a local area network or at a site on the Internet's World Wide Web. Any of these apparatuses may be wireless or wirelessly connected.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 504 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 520 is responsible for scanning casts of the patient's teeth obtained either from the patient or from an orthodontist and providing the scanned digital data set information to data processing system 500 for further processing. In a distributed environment, scanner 520 may be located at a remote location and communicate scanned digital data set information to data processing system 500 over network interface 524.

Fabrication machine 522 fabricates dental appliances based on intermediate and final data set information received from data processing system 500. In a distributed environment, fabrication machine 522 may be located at a remote location and receive data set information from data processing system 500 over network interface 524. Any of these aligners described herein (including sequences of aligners) may be fabricated by 3D printing, or the like.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

The techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for treating a patient's teeth to improve the patient's buccal corridor, the method comprising:
    obtaining, in a computing system, a representation of the patient's dentition corresponding to a dental arch;
    determining an initial measure of the patient's buccal corridor for the dental arch;
    determining a target measure of the patient's buccal corridor for the dental arch, wherein determining the target measure of the patient's buccal corridor for the dental arch comprises determining, for at least some of the patient's teeth in the dental arch, an optimized tooth angle between a symmetry plane through a midline of the dental arch and a line from an assessment point on the symmetry plane at a pre-determined distance anterior to the dental arch, to a new position of the patient's tooth such that, for a given tooth: a visibility width of any tooth posterior to the given tooth is less than a visibility width of the given tooth; and the visibility widths of the patient's teeth from anterior to posterior decrease;
    using the initial measure of the patient's buccal corridor and the target measure of the patient's buccal corridor to determine a treatment plan comprising a series of orthodontic aligners configured to incrementally move the patient's teeth through each stage of the series to improve the patient's buccal corridor to approximate the target measure of the patient's buccal corridor,
        wherein using the initial measure of the patient's buccal corridor and the target measure of the patient's buccal corridor to determine a treatment plan comprises estimating a target dental arch model based on the optimized tooth angles;
    outputting the treatment plan; and
    generating one or more orthodontic aligners in the series of orthodontic aligners from the target dental arch model.

2. The method of claim 1, wherein determining the initial measure of the patient's buccal corridor comprises determining, for at least some of the patient's teeth in the dental arch, an initial tooth angle between a symmetry plane through a midline of the dental arch and a line tangent to each tooth that intersects an assessment point on the symmetry plane at a pre- determined distance anterior to the dental arch.

3. The method of claim 1, wherein determining the initial measure of the patient's buccal corridor for the dental arch comprises estimating a distance between the patient's cheeks and a buccal side of the patient's teeth.

4. The method of claim 1, wherein determining the target measure of the patient's buccal corridor for the dental arch comprises estimating a target distance between the patient's cheeks and a buccal side of the patient's teeth.

5. A system comprising:
    one or more processors;
    memory coupled to the one or more processors, the memory storing computer-program instructions, that, when executed by the one or more processors, perform a computer- implemented method comprising:
        obtaining, in a computing system, a representation of a patient's dentition corresponding to a dental arch;
        determining an initial measure of the patient's buccal corridor for the dental arch;
        determining a target measure of the patient's buccal corridor for the dental arch, wherein the step of determining the target measure of the patient's buccal corridor of the computer-implemented method comprises determining, for at least some of the patient's teeth in the dental arch, an optimized tooth angle between a symmetry plane through a midline of the dental arch and a line from an assessment point on the symmetry plane at a pre-determined distance anterior to the dental arch, to a new position of the patient's tooth such that, for a given tooth: a visibility width of any tooth posterior to the given tooth is less than a visibility width of the given tooth; and the visibility widths of the patient's teeth from anterior to posterior decrease;

using the initial measure of the patient's buccal corridor and the target measure of the patient's buccal corridor to determine a treatment plan comprising a series of orthodontic aligners configured to incrementally move the patient's teeth through each stage of the series to improve the patient's buccal corridor to approximate the target measure of the patient's buccal corridor, wherein the step of using the initial measure of the patient's buccal corridor and the target measure of the patient's buccal corridor to determine a treatment plan of the computer-implemented method further comprises estimating a target dental arch model based on the optimized tooth angles;

outputting the treatment plan; and generating one or more orthodontic aligners in the series of orthodontic aligners from the target dental arch model.

6. The system of claim 5, wherein the step of determining the initial measure of the patient's buccal corridor of the computer-implemented method comprises determining, for at least some of the patient's teeth in the dental arch, an initial tooth angle between a symmetry plane through a midline of the dental arch and a line tangent to each tooth that intersects an assessment point on the symmetry plane at a pre-determined distance anterior to the dental arch.

7. The system of claim 5, wherein the step of determining the initial measure of the patient's buccal corridor for the dental arch of the computer-implemented method further comprises estimating a distance between the patient's cheeks and a buccal side of the patient's teeth.

8. The system of claim 5, wherein the step of determining the target measure of the patient's buccal corridor for the dental arch of the computer-implemented method further comprises estimating a target distance between the patient's cheeks and a buccal side of the patient's teeth.

* * * * *